United States Patent [19]

Fox

[11] Patent Number: 4,515,474

[45] Date of Patent: May 7, 1985

[54] METHOD AND APPARATUS FOR DETERMINING PEAK TEMPERATURE ALONG AN OPTICAL FIBER

[75] Inventor: Richard J. Fox, Oak Ridge, Tenn.

[73] Assignee: The United States of America as represented by the United States Department of Energy, Washington, D.C.

[21] Appl. No.: 403,278

[22] Filed: Jul. 29, 1982

[51] Int. Cl.$^3$ .............................. G01J 5/08; G01J 5/28
[52] U.S. Cl. ........................................ 356/44; 374/161
[58] Field of Search .......................... 356/43, 44, 73.1; 374/131, 161; 250/227

[56] References Cited

U.S. PATENT DOCUMENTS

| | | | |
|---|---|---|---|
| 4,295,739 | 10/1981 | Meltz et al. | 356/44 X |
| 4,316,388 | 2/1982 | Miller et al. | 356/44 X |
| 4,354,735 | 10/1982 | Stowe et al. | 356/44 X |
| 4,417,782 | 11/1983 | Clarke et al. | 356/44 X |

FOREIGN PATENT DOCUMENTS 74084  7/1978  Japan .................................. 356/73.1

OTHER PUBLICATIONS

Gottlieb et al., "Measurement of Temperature with Optical Fibers", ISA Transactions, vol. 19, No. 4, pp. 55-63 (1980).

*Primary Examiner*—Vincent P. McGraw
*Attorney, Agent, or Firm*—David E. Breeden; Stephen D. Hamel; Judson R. Hightower

[57] ABSTRACT

The invention relates to a new method and new apparatus for determining the hottest temperature or the coldest temperature prevailing along the length of an optical-fiber light guide. The invention is conducted with an optical fiber capable of supporting multidiode propagation of light and comprising a core, a cladding, and a jacket. The core is selected to have (1) a higher refractive index than the core and the cladding and (2) a relatively high negative temperature coefficient of refractive index. A light beam capable of establishing substantially single-mode propagation in the core is launched into an end thereof at an angle to the axis. The angle is increased to effect the onset of light refraction from the core into the cladding. The value of the launch angle corresponding to the onset is determined and then used to establish the refractive index of the core corresponding to the onset angle. The maximum temperature prevailing along the fiber then is determined from the (1) refractive index so determined and (2) the temperature coefficient of refractive index for the core. The invention is based on the finding that the launch angle corresponding to the onset of refraction into the cladding is uniquely determined by the maximum value of the ratio of the core refractive index to the cladding refractive index, which maximum occurs at the hottest point along the fiber.

10 Claims, 4 Drawing Figures

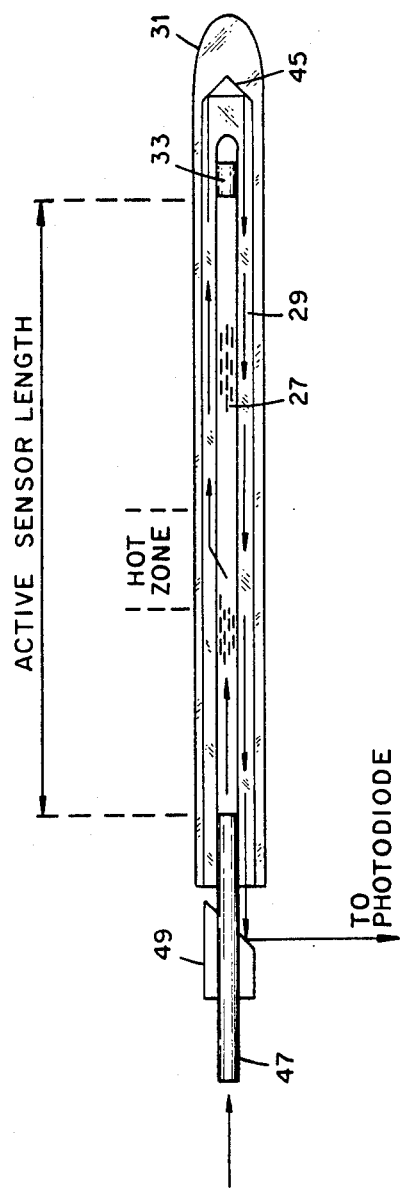

METHOD AND APPARATUS FOR DETERMINING PEAK TEMPERATURE ALONG AN OPTICAL FIBER

The invention is a result of a contract with the United States Department of Energy.

BACKGROUND OF THE INVENTION

This invention relates broadly to optical-fiber systems for measuring temperature and, more particularly, to methods and systems for determining the most extreme temperature prevailing along the length of an optical-fiber light guide.

It is well known that the temperature of high-voltage electrical equipment may be determined remotely by means of a monitoring system which responds to temperature-induced changes in the light-propagation or loss characteristics of an optical fiber of the kind comprising a core, a core cladding, and a jacket for the cladding. Several such systems are proposed or referenced in the following publication: *ISA Transactions*, Vol. 19, No. 4, pp. 55–62. Those systems and other known temperature-monitoring systems of the optical-fiber type are suitable for determining the average temperature along the length of the fiber. They are, however, unable to discriminate between small temperature change affecting a long length of the fiber and a large temperature change affecting a short length thereof. Thus, they are unsuitable for certain applications—such as determining the maximum temperature prevailing along the length of a fiber deployed within a high-voltage transformer or within a tunnel containing high-voltage electrical cable.

SUMMARY OF THE INVENTION

Accordingly, it is an object of the invention to provide a novel system and a novel method for sensing temperatures with an optical-fiber light guide.

It is another object to provide a method and system for determining the highest temperature prevailing at any point along a light guide.

It is another object to provide a method and system for determining the lowest temperature prevailing at any point along a light guide.

Other objects and advantages will be made evident hereinafter.

In one aspect, the invention may be summarized as temperature-sensing apparatus including an optical fiber capable of supporting multimodal propagation of light. The fiber comprises (a) a core whose refractive index decreases with increasing temperature, (b) a cladding therfor having a lower refractive index than the core, and (c) a jacket for the cladding having a lower refractive index than the cladding. A light source is provided to launch into the core a beam of light which establishes single-mode propagation in the core and which defines with the core axis a launch angle of progressively changing magnitude. Means are provided for (a) generating a first output indicative of the onset of light refraction into the cladding from the core; (b) responding to the first output by generating a second output indicative of the value of the launch angle coincident with that onset; and (c) responding to the second output by generating an output indicative of the fiber temperature corresponding to that value of the launch angle.

In another aspect, the invention is a method for determining the maximum temperature prevailing along an optical fiber. The method includes the steps of providing an optical fiber of the kind defined in the preceding paragraph; launching into the core a light beam defining a launch angle with the axis of the core, the beam being selected to establish substantially single-mode light propagation in the core; increasing the launch angle to effect onset of light refraction from the core into the fiber cladding; determining the value of the launch angle coincident with the onset; determining from that value the corresponding refractive index for the core; and determining, from the index so determined and the temperature coefficient of refractive index for the core, the corresponding peak temperature for said fiber.

BRIEF DESCRIPTION OF THE DRAWINGS

FIG. 4 is a schematic diagram of an alternative form of the light fiber 13 shown in FIG. 2.

DETAILED DESCRIPTION OF THE INVENTION

Figure 3:
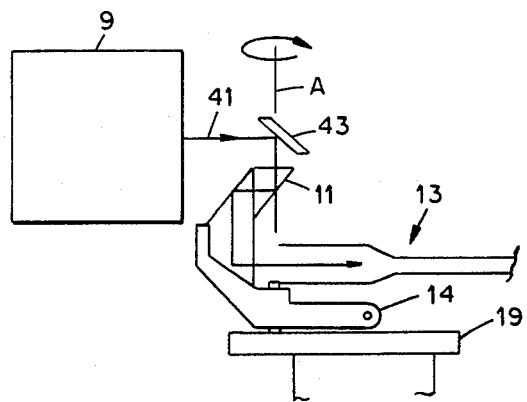
FIG. 3 is a detail view of part of the same.

The invention is designed particularly for the remote determination of the peak temperature prevailing along an optical fiber deployed in a region where the use of electrically conductive instrumentation is undesirable. The region may, for example, be characterized by high electric or magnetic fields, high voltage, or an explosive atmosphere.

EXAMPLE I

The principle of the invention was demonstrated in experiments which I conducted with a gas-laser light source and a transparent, dielectric optical fiber consisting of a liquid silicone core (relatively high refractive index, $n_1$), a silica cladding (lower refractive index $n_2$), and a Teflon jacket (still lower refractive index, $n_3$). These materials were selected to meet the constraint that $(d/dT)(n_1-n_2)>0$ in order to determine maximum temperature above ambient. The optical fiber (length, 50 cm) was selected to have a bore diameter (0.5 mm) capable of supporting multimode propagation of light. A gas-laser light source (single mode, randomly polarized 633-nm He-Ne laser) was chosen to effect excitation of essentially only one mode of propagation at a time. The fiber was mounted on an indexing table arranged so that for each determination the laser beam was launched into an end of the core at a gradually increasing angle to the core axis. Liquid silicone (Dow-Corning Corporation, Silicone No. 702) was selected for the core, primarily because it has a high negative temperature coefficient of refractive index—i.e., $(dn_1/dT)=-3.5\times 10^{-4}$° C.—compared to silica. In addition, liquid silicone is characterized by small mode conversion, high stability, and a relatively high boiling point (300° C.). A cobalt-glass light sink was mounted in the core at the end opposite the laser to absorb the light reaching that point without scattering it. A standard photodiode was mounted at the outlet end of the fiber to detect light propagation in the cladding and thus generate an output indicative of the onset of refraction of light into the cladding from the core. All but 25% of the entrance area of the core was masked to minimize the excitation of high-order skew modes.

A 3-mm length of the optical fiber was heated to several temperatures between ambient and 190° C. to simulate localized hot zones. The heating reduced the refractive index of the core in this zone, thus decreasing the critical angle for optical refraction into the cladding. In accordance with the invention, at each temperature the laser-beam launch angle was gradually increased from an initial value of 0° angular degrees until an abrupt increase in the output of the photodiode was observed. The value of the launch angle coinciding with the abrupt increase in photodiode output was noted, this being the "minimum-theta" value corresponding to the onset of refraction of light from the core into the cladding. Each minimum-theta value so determined then was substituted into the expression $n_{1(T)} = \sqrt{n_2^2 + \sin^2\theta_o}$ to determine the corresponding index values for the heated core. The core temperatures (T) corresponding to these indices then were calculated from the known temperature dependence of the refractive index for this silicone, in accordance with the following:

$$T = \frac{n_1(T) - n_1(O)}{dn_1/dT},$$

where $\frac{dn_1}{dT} = -3.5 \times 10^{-4}/°C$ and $n_1(O) = 1.524$.

Figure 1:
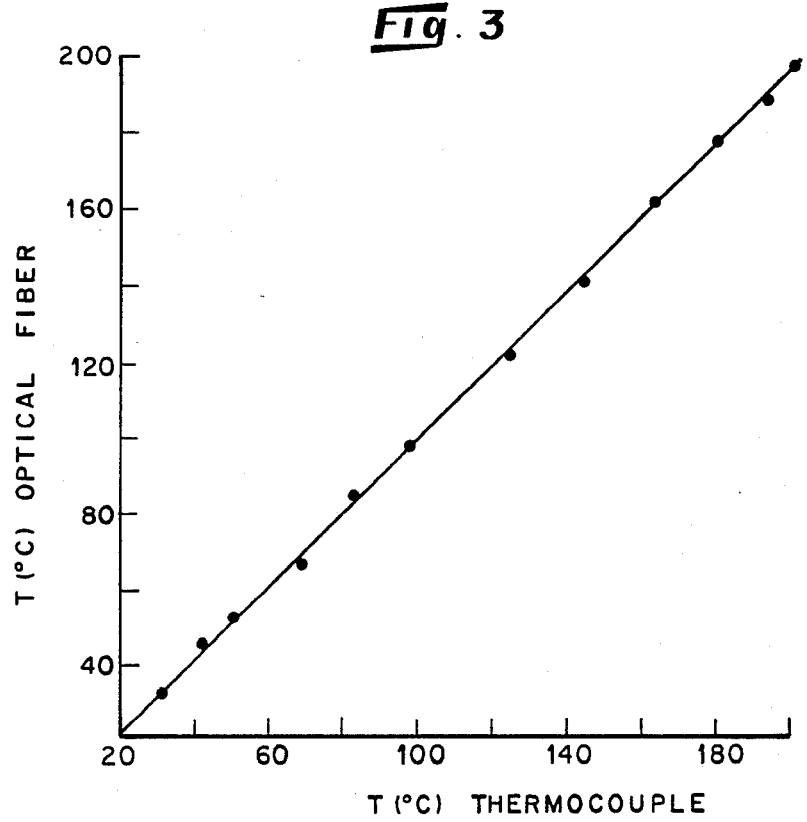
FIG. 1 is a graph correlating actual hot-spot temperatures prevailing along an optical fiber with experimentally derived values obtained in accordance with the invention.

FIG. 1 is a plot comparing (a) twelve temperatures determined as described above with (b) the actual hot-spot temperatures as measured with a thermocouple. As shown, the experimentally derived temperatures corresponded closely to the thermocouple measurements.

The foregoing experiment demonstrated that the minimum launch angle at which light escapes from the optical fiber cladding is uniquely determined by the maximum value of $n_2/n_1(T)$, which is attained at the hottest point along the fiber. The higher the peak temperature along the fiber, the smaller the minimum-theta value of the launch angle.

EXAMPLE II

Figure 2:
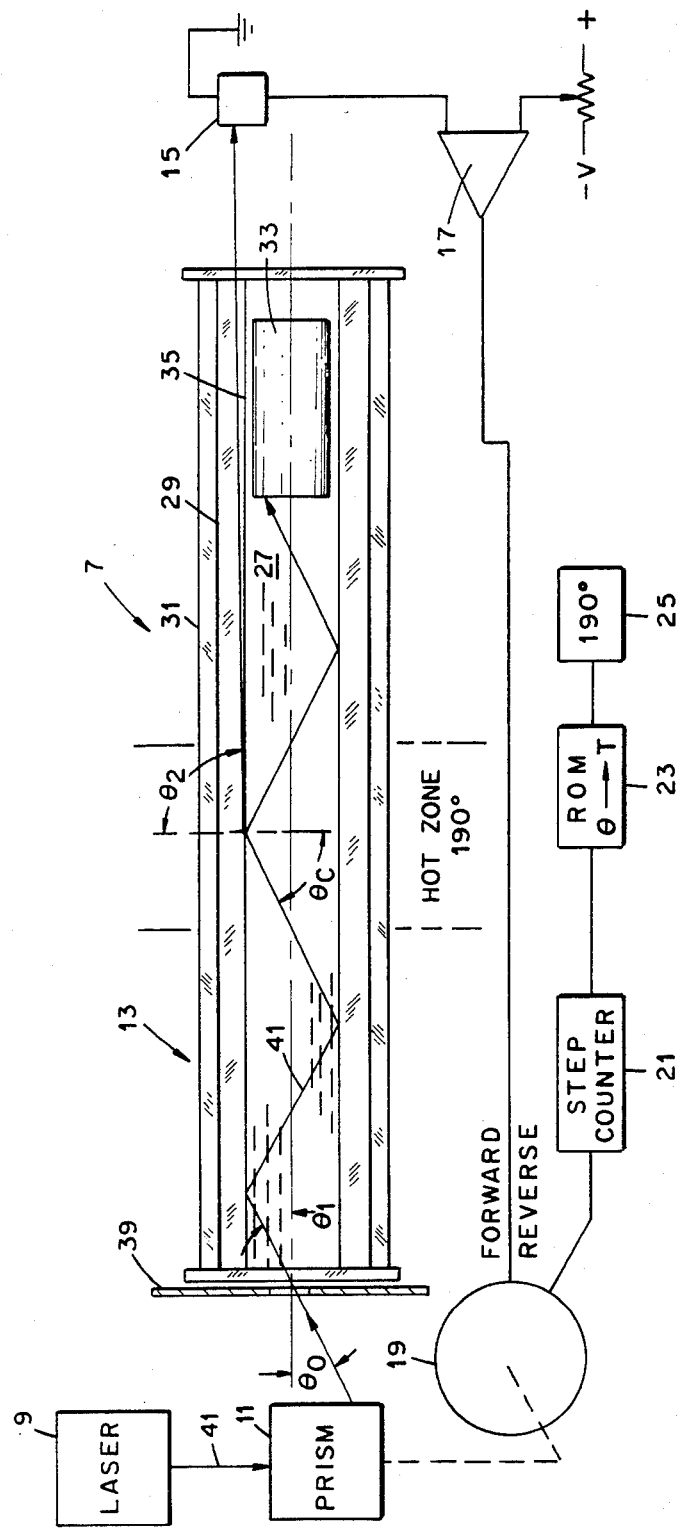
FIG. 2 is a schematic diagram of a temperature-determining system designed in accordance with the invention.

FIGS. 2 and 3 illustrate the invention as embodied in a system 7 for automatically and instantaneously displaying the maximum temperature prevailing at any point along an optical fiber threaded through the coils of a transformer. In the illustrated "double-ended" arrangement, both ends of the light guide are accessible. The system may consist throughout of conventional components.

Briefly, the system 7 includes a gas laser 9; light-launching means 11; an optical fiber 13 whose ends are closed by optically flat windows; a photodiode 15; an operational amplifier comparator 17; a reversible stepper motor 19; an up-down step counter 21; a read-only memory device 23; and a temperature-display device 25. The fiber 13 may comprise a liquid-silicone core 27, a silica cladding 29, and a Teflon jacket 31. Any suitable light sink 33, such as cobalt glass, is provided in the end of the core opposite the laser. The photodiode is positioned to generate an output in response to the propagation of light in the cladding. This output is fed to the comparator 17, which compares it with a reference voltage which has been preselected to discriminate against any relatively small amount of light which scatters into the cladding as a result of impurities or imperfections in the optical fiber.

The launcher 11 is a rotatable prism (FIG. 2) for receiving the laser beam 41 and directing it into an end of the core. The prism is rotatably supported by the motor 19, which drives the prism stepwise about an axis A, each step comprising 1/10 of an angular degree. When energized in the forward direction, the motor increases the launch angle $\theta_o$ incrementally from a preselected initial value of zero angular degrees. With the launch angle at zero, virtually all of the light introduced to the fiber is confined in the core. Thus, at this time the photodiode output is less than the aforementioned reference voltage, and the comparator impresses a "forward" signal on the motor 19. The motor responds by increasing the launch angle incrementally until the angle reaches the minimum-theta value—i.e., the value where the light incident on the core-cladding interface slightly exceeds the critical angle $\theta_c$. As a result, a fraction 35 of the light is refracted into the cladding at a very small angle to the core and is guided therein as a very low-order mode. The propagation of light in the cladding abruptly increases the photodiode output to a value exceeding the above-mentioned reference voltage. This changes the polarity of the comparator output, impressing a reverse signal on the stepper 19. The stepper decreases the launch angle by a few steps, eliminating refraction of light into the cladding, after which the stepper again increases the launch angle to the value initiating light propagation in the cladding. Thus, the system hunts about the minimum-theta value for the launch angle. The launch angle is returned to zero by reversing the stepper motor manually or automatically until an actuator arm 14 moved thereby opens a stop switch (not shown). The step-counter 21 is an up-down counter whose digital output is proportional to the prevailing value of the launch angle. This output addresses the read-only memory in which the aforementioned maximum-temperature values corresponding to the various minimum-theta values are burned. The addressed maximum temperature is displayed by the device 25, which may comprise light-emitting diodes.

Referring more particularly to the circuitry shown in FIG. 2, the output from the comparator 17 may be fed to a polarity-sensitive driver for selectively energizing the forward and reverse windings of the stepper motor 19. The counter 21 is of the BCD type and is coupled to hex buffers and latches which address a ROM "look-up" table to find the corresponding temperature and display this digitally.

Still referring to FIGS. 2 and 3, the jacket 31 preferably comprises a commercially available heat-shrinkable material consisting of an inner layer of FEP resin and an outer layer of TFE Teflon. To avoid entrapping air bubbles in the core, the capillary 29 may be vacuum-backfilled with the liquid silicone. The glass light-sink 33 is loosely fitted in the capillary, since they have different thermal expansion coefficients. Preferably, the light-sink has a refractive index close to that of the core liquid, to minimize Fresnel reflections at the silicone-glass interface. If desired, the portion of the core extending rearwardly of the sink may be filled with silicone containing a dye (e.g., alizarine cyanine) preventing diffusion of light. An air bubble may be provided at the launch end of the core to accommodate expansion of the silicone. For convenience, the fiber may be designed with an enlarged launch end as illustrated in FIG. 3. As shown in that figure, a fixed mirror 43 may be provided to direct the laser beam onto the prism 11.

EXAMPLE III

FIG. 4 illustrates a somewhat different form of light guide which may be used in a system of the kind shown in FIGS. 2 and 3 in the event only one end of the optical fiber is to be accessible. In this alternative arrangement, the laser beam enters the core via a glass-fiber plug 47. The end of the silica capillary remote from the laser is enclosed by the jacket 31 and is formed as a prism 45, provided to receive the light refracted into the cladding and reflect the same back to the launch end of the fiber through the cladding. The prism may be formed by flame-sealing the end of the capillary and polishing the sealed end to provide two surfaces defining an angle of 90°. To provide the silica/air interface necessary for internal reflection, a void is left between the jacket and the prism. An angled mirror 49 is provided at the launch end of the fiber to direct the reflected beam from the cladding into the above-described circuitry. In accordance with the invention, the capillary 29 is sized to be capable of supporting multimode progagation of light, and the light source is selected to excite a single mode at a time.

The foregoing embodiments of the invention have been chosen as best teaching the principle of the invention. It will be apparent that various modifications and alterations may be made within the scope of the appended claims. For instance, the foregoing disclosure relates to fibers whose cladding has a refractive index which varies relatively little with temperature. In instances where both the core and the cladding have temperature-dependent indices, these may be combined into an intermediate, or effective, dn/dT. As another instance, the invention has been illustrated in terms of a visible-light source, but an infrared source may be used. The longer wave lengths appreciably reduce Rayleigh scattering and may be preferred for use with long light guides. Again, it is apparent that a rotatable mirror may be substituted for the above-mentioned prism. As indicated in Example I, the capillary may be moved relative to the light source to effect the desired increase in launch angle. Preferably, the core material is an organic liquid; other suitable liquids may be used, such as tetrachlorethylene or a chlorinated aliphatic, such as hexachlorobuta-1,3-diene. Any suitable cladding or jacketing materials may be used. Given the teachings herein, it will be apparent to those skilled in the art that other circuitry may be utilized to accomplish the purposes of the circuit described above. For instance, the value of the launch angle corresponding to the onset of refraction into the cladding may be determined by measuring the time delay between the start of the launch sweep and the appearance of light in the cladding.

Where the invention is applied to the determination of hot spots, the core and cladding are selected to that an increase in temperature effects a decrease in the difference in their refractive indices. For the determination of cold spots—i.e., the coldest temperature along the fiber—the core and cladding would be selected so that the difference in their indices decreases with temperature. This effect could be achieved, for instance, by utilizing a silica core encompassed by liquid silicone or polymerized silicone "cladding", and a jacket having a lower refractive index than the cladding. The minimum temperature along the fiber is determined by the already described steps of launching a light beam into the core, increasing the launch angle, and determining the value of the lanuch angle coincident with onset of light propagation in the cladding. The onset-value of the launch angle then is used to determine the corresponding refractive index for the cladding. This refractive-index value and the temperature coefficient of the refractive index of the cladding are used to determine the corresponding minimum temperature of the fiber. This method should be capable of determining temperatures at least as low as −79° C.

What is claimed is:

1. Temperature-sensing apparatus, comprising:
   an optical fiber capable of supporting multimodal propagation of light and including (a) a core whose refractive index decreases with increasing temperature, (b) a cladding therefor having a lower refractive index than said core, and (c) a jacket for said cladding having a lower refractive index than said cladding,
   a light source mounted to launch into said core a light beam defining with the core axis a launch angle of progressively changing magnitude, said light beam being selected to establish substantially single-mode light propagation in said core,
   light-responsive means associated with said cladding for generating a first output indicative of onset of light refraction therein from said core,
   means responsive to the first output for generating a second output indicative of the value of the launch angle coincident with said onset, and
   means responsive to the second output for generating an output indicative of the fiber temperature corresponding to said value.

2. The apparatus of claim 1 wherein said core is an organic liquid.

3. The apparatus of claim 1 wherein said cladding is silica.

4. The apparatus of claim 1 wherein said light source comprises a gas laser whose output is directed into said core via a reflective surface which is movable about an axis.

5. The apparatus of claim 4 further including means for moving said reflective surface stepwise about said axis.

6. A method for generating an output indicative of the maximum temperature prevailing in an optical-fiber, said method comprising:
   providing an optical fiber capable of supporting multimodal propagation of light and including (a) a core whose refractive index decreases with increasing temperature, (b) a cladding therefor having a lower refractive index than said core, and (c) a jacket for said cladding having a lower refractive index than said cladding,
   launching into said core a light beam defining a launch angle with the axis of said core, said beam being selected to establish substantially single-mode light propagation in said core,
   increasing said launch angle to effect onset of light refraction from said core into said cladding,
   determining the value of said launch angle coincident with said onset,
   determining from said value, the corresponding minimum refractive index for said core, and
   determining from said minimum refractive index and the temperature coefficient of refractive index of said core, the corresponding peak temperature for said fiber.

7. The method of claim 6 wherein said core is an organic liquid.

8. The method of claim 7 wherein said liquid is silicone.

9. The method of claim 6 wherein said light beam is generated by a gas laser.

10. A method for generating an output indicative of the minimum temperature prevailing in an optical fiber, said method comprising:

providing an optical fiber capable of supporting multimodal propagation of light and including (a) a core whose refractive index is essentially independent of temperature, (b) a cladding therefor having a refractive index which is lower than that of said core and which increases with decreasing temperature, and (c) a jacket for said cladding having a lower refractive index than said cladding, launching into said core a light beam defining a launch angle with the axis of said core, said beam being selected to establish substantially single-mode light propagation in said core, increasing said launch angle to effect onset of light refraction from said core into said cladding, determining the value of said launch angle coincident with said onset, determining from said value, the corresponding minimum refractive index for said core, and determining from said minimum refractive index and the temperature coefficient of refractive index of said cladding the corresponding minimum temperature for said fiber.

* * * * *